United States Patent
Kim

(10) Patent No.: US 10,823,283 B2
(45) Date of Patent: Nov. 3, 2020

(54) FORCED NEUTRAL RETURN DEVICE FOR AUTOMATED MANUAL TRANSMISSION

(71) Applicant: HYUNDAI DYMOS INCORPORATED, Chungcheongnam-do (KR)

(72) Inventor: Won Kim, Gyeonggi-do (KR)

(73) Assignee: HYUNDAI DYMOS INCORPORATED (KR)

( * ) Notice: Subject to any disclaimer, the term of this patent is extended or adjusted under 35 U.S.C. 154(b) by 305 days.

(21) Appl. No.: 15/995,465

(22) Filed: Jun. 1, 2018

(65) Prior Publication Data

US 2018/0372215 A1    Dec. 27, 2018

(30) Foreign Application Priority Data

Jun. 22, 2017   (KR) .................. 10-2017-0079039

(51) Int. Cl.

| F16H 61/02 | (2006.01) |
|---|---|
| F16H 61/16 | (2006.01) |
| F16H 61/28 | (2006.01) |
| F16H 59/02 | (2006.01) |
| F16H 61/30 | (2006.01) |

(52) U.S. Cl.
CPC ......... *F16H 61/16* (2013.01); *F16H 59/0204* (2013.01); *F16H 61/0276* (2013.01); *F16H 61/30* (2013.01); *F16H 2061/0279* (2013.01); *F16H 2061/168* (2013.01)

(58) Field of Classification Search
CPC .......... F16H 61/16; F16H 61/28; F16H 61/30; F16H 61/22; F16H 61/0276; F16H 2061/168; F16H 59/0204
See application file for complete search history.

(56) References Cited

U.S. PATENT DOCUMENTS 5,661,998 A * 9/1997 Genise .................... F15B 11/10
74/335

FOREIGN PATENT DOCUMENTS

| KR | 2019990031627 | 7/1999 |
| KR | 200303566 | 1/2003 |
| KR | 20150129119 A | 11/2015 |

OTHER PUBLICATIONS

Korean Office Action Corresponding to Korean Application No. 10-2017-0079039 dated Oct. 18, 2018.

* cited by examiner

*Primary Examiner* — Luis A Gonzalez
(74) *Attorney, Agent, or Firm* — Tarolli, Sundheim, Covell & Tummino LLP

(57) ABSTRACT

Disclosed is a forced neutral return device for an automated manual transmission forcibly operating a shift cylinder of a pneumatic pressure actuator for the automated manual transmission to return shift neutral position including an air injection passage forcibly injecting outside air into the inside of the shift cylinder and a valve assembly for opening and closing the air injection passage. It is possible to easily return neutral position when the neutral of the automated manual transmission is required.

7 Claims, 8 Drawing Sheets

[FIG. 5]
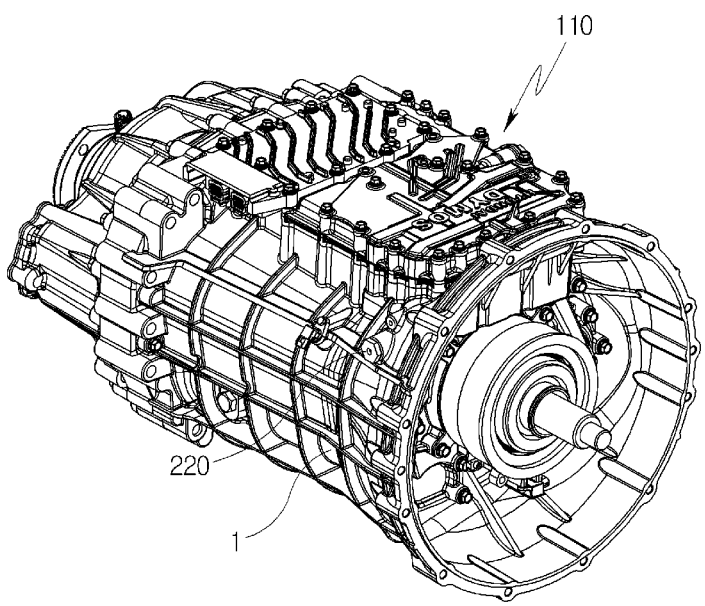
[FIG. 6]
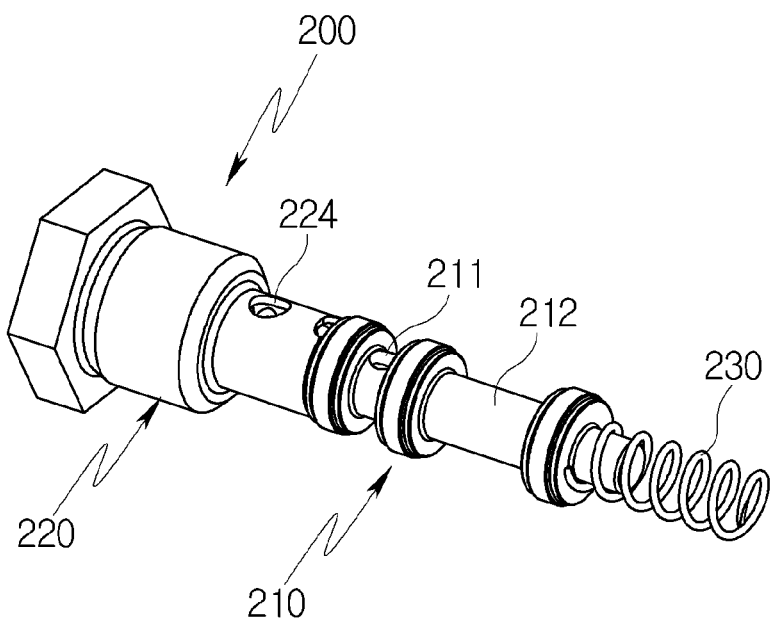

[FIG. 7]
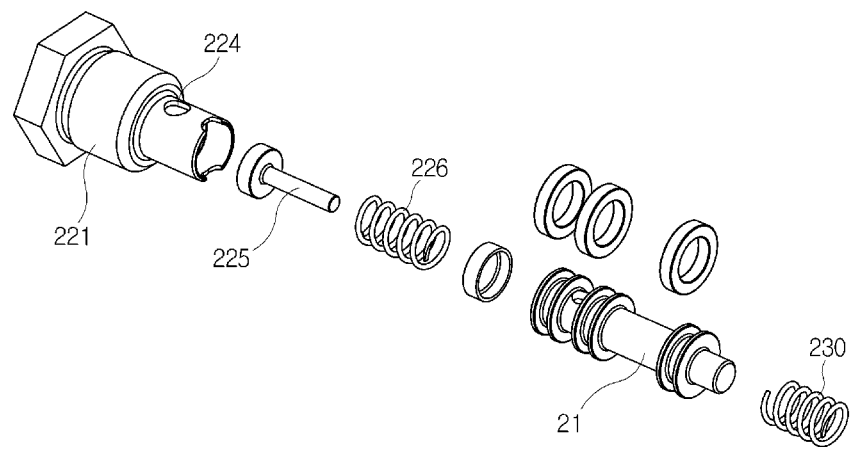

[FIG. 8]
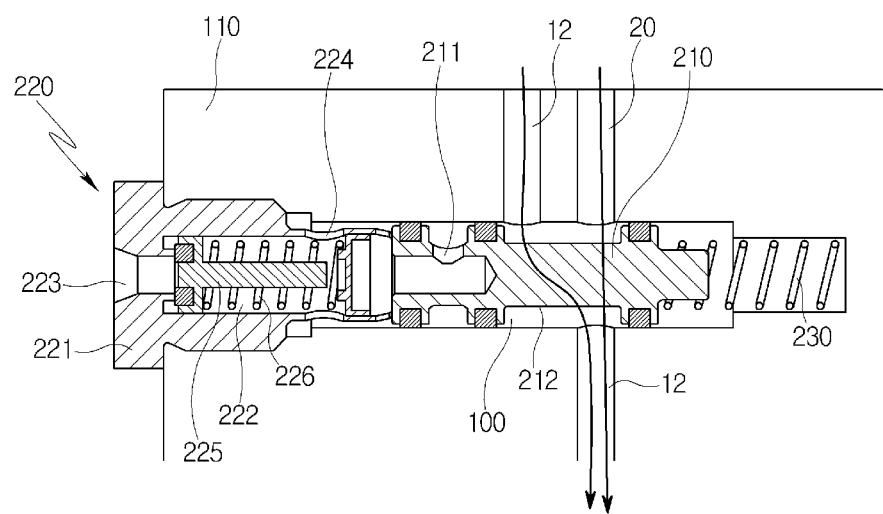

[FIG. 9]
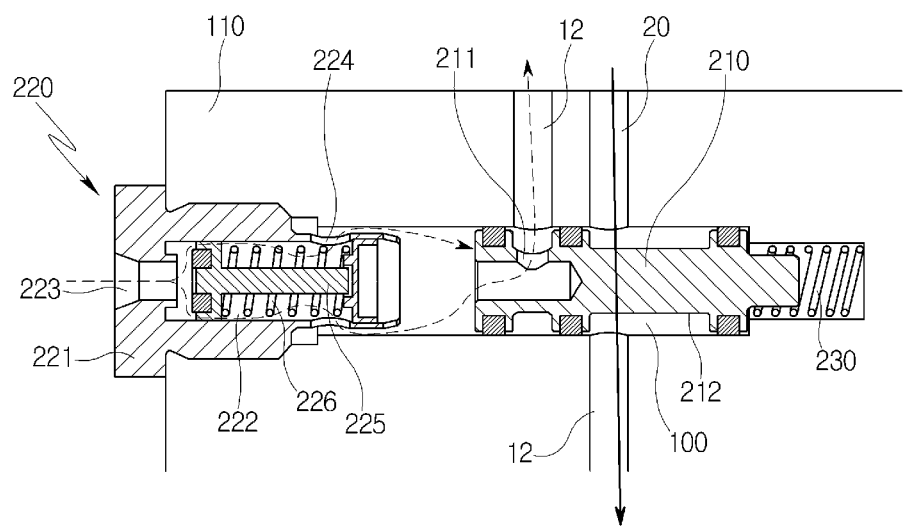

FORCED NEUTRAL RETURN DEVICE FOR AUTOMATED MANUAL TRANSMISSION

CROSS-REFERENCE(S) TO RELATED APPLICATIONS

This application claims priority to Korean Patent Application No. 10-2017-0079039, filed on Jun. 22, 2017, the disclosure of which is incorporated herein by reference in its(their) entirety.

BACKGROUND OF THE DISCLOSURE

Field of the Disclosure

The present disclosure relates to a forced neutral return device for an automated manual transmission, and more particularly, to a forced neutral return device for an automated manual transmission that forces operation to a neutral position when gear neutral is required in the automated manual transmission.

Description of the Related Art

Generally, the transmission of a vehicle is largely classified into a manual transmission in which the driver manually performs the shift and an automatic transmission in which the shift is automatically performed in accordance with the running state. The manual transmission has problems that it is difficult for a novice driver to operate and there is a lot of driving fatigue when driving in the city or traffic congestion, but advantages that the fuel efficiency is good and the driver can achieve the desired acceleration performance.

The automated manual transmission (AMT) is a device that implements the automatic transmission function by automating the shifting mechanism of the manual transmission and has all the operating convenience of the automatic transmission while maintaining the good fuel efficiency of the manual transmission as it is. The automated manual transmission has a gear actuator for automatic shifting. Various types of gear actuators have been developed, including pneumatic pressure, hydraulic pressure and electric motor way, and so on.

Referring to FIGS. 1 to 3, the pneumatic pressure actuator 10 of the automated manual transmission 1 is composed of a shift cylinder 11 causing an operating force for gear shift of each stage, a select cylinder for gear selection, several additional cylinders depending on the transmission structure and valves for operating the cylinders. The pneumatic pressure shift cylinder 11 forming the pneumatic pressure actuator 10 of the automated manual transmission 1 applies a two-position control or three-position control cylinder and generally includes an intake and exhaust port that receives pneumatic pressure from a valve assembly controlling cylinder operation or discharges it. The air inside the shift cylinder 11 is exhausted through the exhaust passage 12 of each cylinder.

Herein, since the automated manual transmission 1 performing automatic shift using pneumatic pressure but being suitable for a large commercial vehicle receives a signal of the transmission controller to operate the shifting device, it is not possible to manually position the gear in a neutral state when the vehicle is difficult to start normally, thereby causing various inconveniences in situations where the transmission neutral is required.

As such, as the case where the transmission neutral is required, there is the case where the transmission is mounted at the engine to assemble the transmission to the vehicle. Since the power of the engine is transmitted by the coupling of a spline formed at an inner diameter portion of a clutch disk inside a clutch cover assembled in an engine flywheel and a spline formed at an outer diameter portion of a transmission input shaft, the directions of the spline formed at the inner diameter portion of the clutch disk assembled at the engine and the spline formed at the outer diameter portion of the transmission input shaft should be aligned in order to assemble the transmission at the engine. For this purpose, by moving a shift lever to be engaged with an arbitrary stage and then rotating the transmission output shaft in the case of manual transmission, the transmission input shaft is rotated for the spline coupling to be completed.

However, as the automated manual transmission does not have the shift lever for manual engagement, the transmission input shaft can be rotated by rotating the transmission output shaft only when the gears should be engaged in the delivery state. Therefore, since the transmission should be in the neutral position in general for the first start after assembling the vehicle, it is troublesome to change the transmission to neutral position after assembling the transmission.

As another case where the transmission neutral is required, the transmission gear should be in neutral position to prevent transmission damage when towing the vehicle. However, if the vehicle equipped with the automated manual transmission does not start or there is a problem in the electrical device of the automated manual transmission, since the vehicle does not have forced neutral function, there is a problem in that the vehicle towing can be achieved only by lifting driving wheels or separating a propeller shaft.

Referring to pneumatic pressure circuit diagram shown in FIG. 3, check valves are provided between the cylinders so that each cylinder associated with the shift does not interfere with each other due to the exhaust pressure between the cylinders and the air passing through the check valves is collected and exhausted into one exhaust port through the exhaust passage 12, thereby the automatic manual transmission 1 cannot be forcibly returned to the neutral state with such structure.

RELATED ART DOCUMENT

Patent Document (Patent Document 1) Korean Patent Laid-Open Publication No. 10-2015-0129119

SUMMARY OF THE DISCLOSURE

The Exemplary embodiments of the present disclosure has been made in order to solve the problems of the conventional automated manual transmission as described above and provide a forced neutral return device for an automated manual transmission capable of easily returning to neutral when the neutral of the automated manual transmission is required.

A forced neutral return device for the automated manual transmission according to the present disclosure in order to achieve the above objects that forcibly operates a shift cylinder of a pneumatic pressure actuator for the automated manual transmission to return shift neutral position, may include an air injection passage forcibly injecting outside air into the inside of the shift cylinder and a valve assembly opening and closing the air injection passage.

In the forced neutral return device for the automated manual transmission according to an exemplary embodiment of the present disclosure, the air injection passage may be connected with an exhaust passage of the shift cylinder.

In the forced neutral return device for the automated manual transmission according to an exemplary embodiment of the present disclosure, the valve assembly may include a spool valve selectively opening and closing the air injection passage and the exhaust passage of the shift cylinder by the outside air flowed into the air injection passage.

In the forced neutral return device for the automated manual transmission according to an exemplary embodiment of the present disclosure, the spool valve may include a first spool passage communicating the air injection passage and the exhaust passage of the shift cylinder when the outside air is flowed into the air injection passage and a second spool passage opening the exhaust passage so that the air of the shift cylinder is exhausted when the outside air flowing into the air injection passage is blocked.

In the forced neutral return device for the automated manual transmission according to an exemplary embodiment of the present disclosure, the valve assembly may further include a check valve assembly allowing the inflow of the outside air into the air injection passage to operate the spool valve and blocking air movement from the air injection passage to the outside.

In the forced neutral return device for the automated manual transmission according to an exemplary embodiment of the present disclosure, the valve assembly may further include a spool return spring returning the spool valve when the inflow of outside air is blocked.

In the forced neutral return device for the automated manual transmission according to an exemplary embodiment of the present disclosure, the check valve assembly may include a check valve body including a check valve passage, an air inlet injecting air into the check valve passage from the outside and an air outlet discharging the air flowed into the check valve passage to the air injection passage in order to operate the spool valve; a check valve provided at the check valve passage slidably; and a check valve spring returning the check valve.

In the forced neutral return device for the automated manual transmission according to an exemplary embodiment of the present disclosure, an air supply device for supplying outside air may be connected with the air inlet of the check valve body.

In the forced neutral return device for the automated manual transmission according to an exemplary embodiment of the present disclosure, an air injection port of the air injection passage may be exposed toward the outside of a transmission housing.

As described above, in accordance with the forced neutral return device of the automated manual transmission according to the present disclosure, the automated manual transmission can be easily returned to neutral by using the air supply mechanism commonly used in the workplace and injecting air into the shift cylinder through the exhaust passage of the cylinder. As a result, the transmission mounting work is facilitated so that the working time can be shortened and the transmission breakage can be prevented by using the forced neutral return function when the vehicle is towed.

BRIEF DESCRIPTION OF THE DRAWINGS

FIG. 5 is a perspective view showing a manual transmission equipped with the forced neutral return device for the automated manual transmission according to an exemplary embodiment of the present disclosure;

FIG. 6 is a combined perspective view of a valve assembly shown in FIG. 4;

FIG. 7 is an exploded perspective view of the valve assembly shown in FIG. 6;

FIG. 8 is a combined cross-sectional view of the valve assembly shown in FIGS. 5 and 6; and FIG. 9 is an operational state diagram of the valve assembly shown in FIG. 8.

DESCRIPTION OF SPECIFIC EMBODIMENTS

Hereinafter, referring to the appended drawings, the present disclosure will be described in detail.

Figure 1:
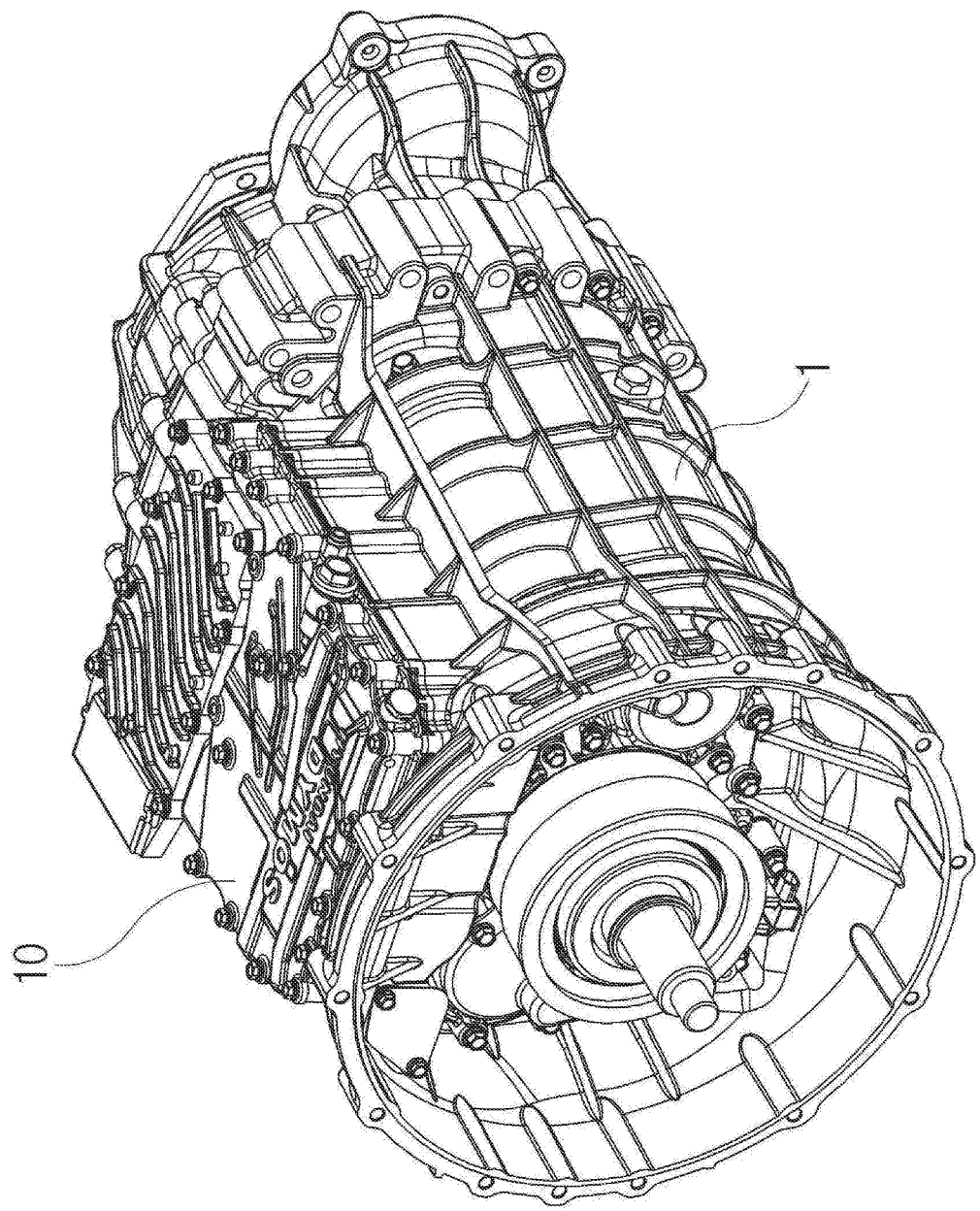
FIG. 1 is a perspective view showing an automated manual transmission equipped with a conventional pneumatic pressure actuator.
Figure 2:
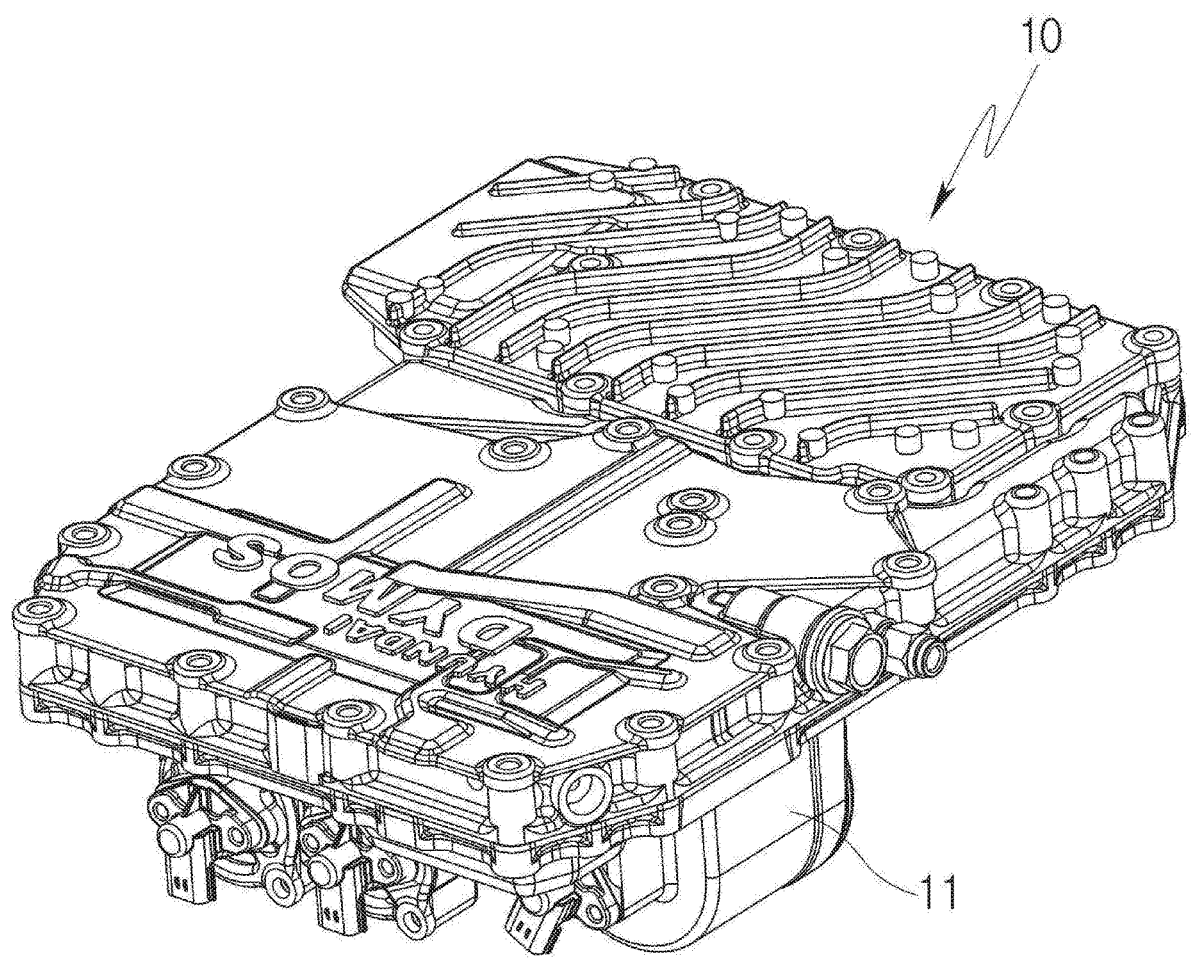
FIG. 2 is a perspective view of the pneumatic pressure actuator shown in FIG. 1.
Figure 3:
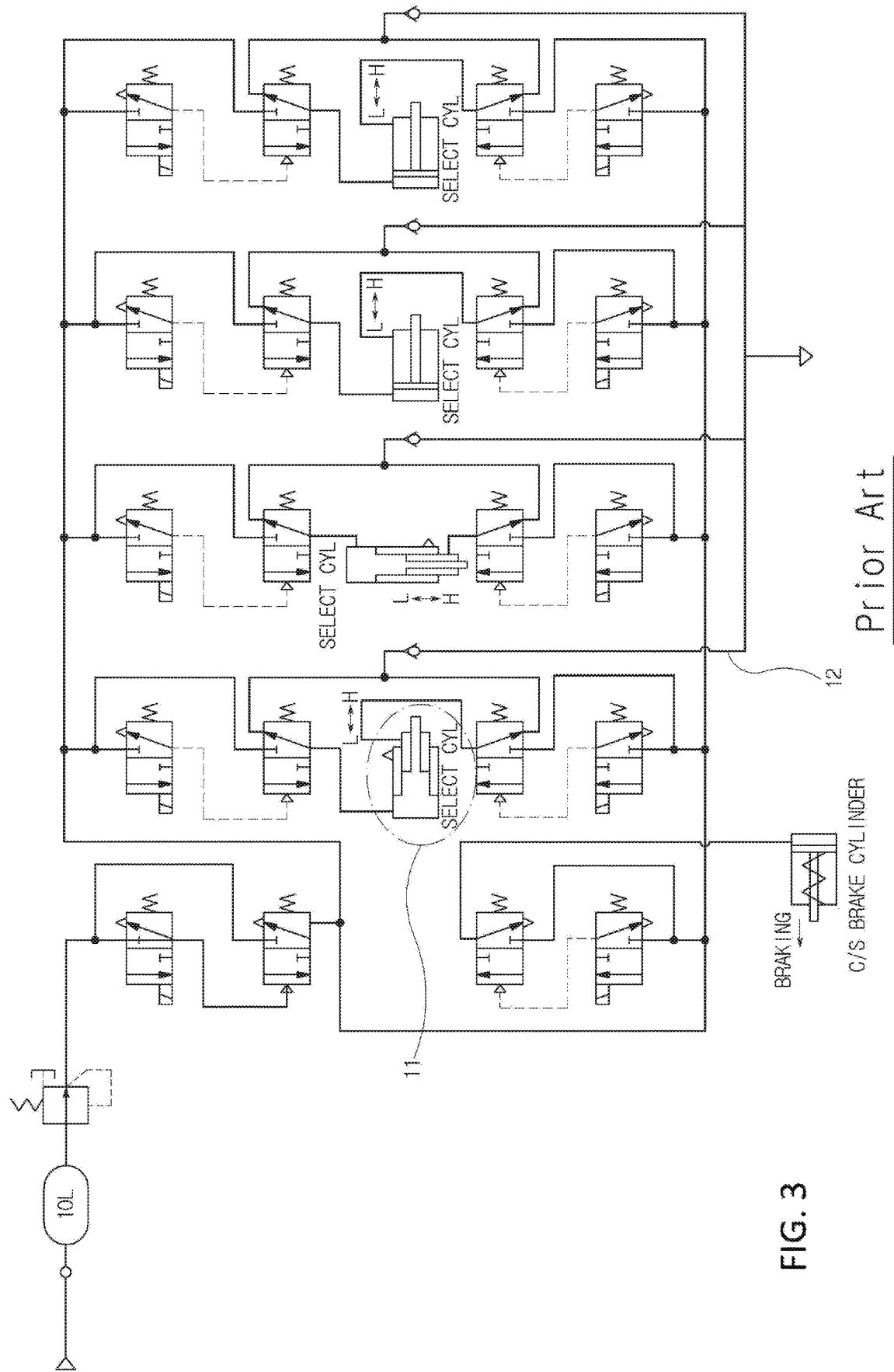
FIG. 3 is a pneumatic pressure circuit diagram of the pneumatic pressure actuator of the conventional automated manual transmission.
Figure 4:
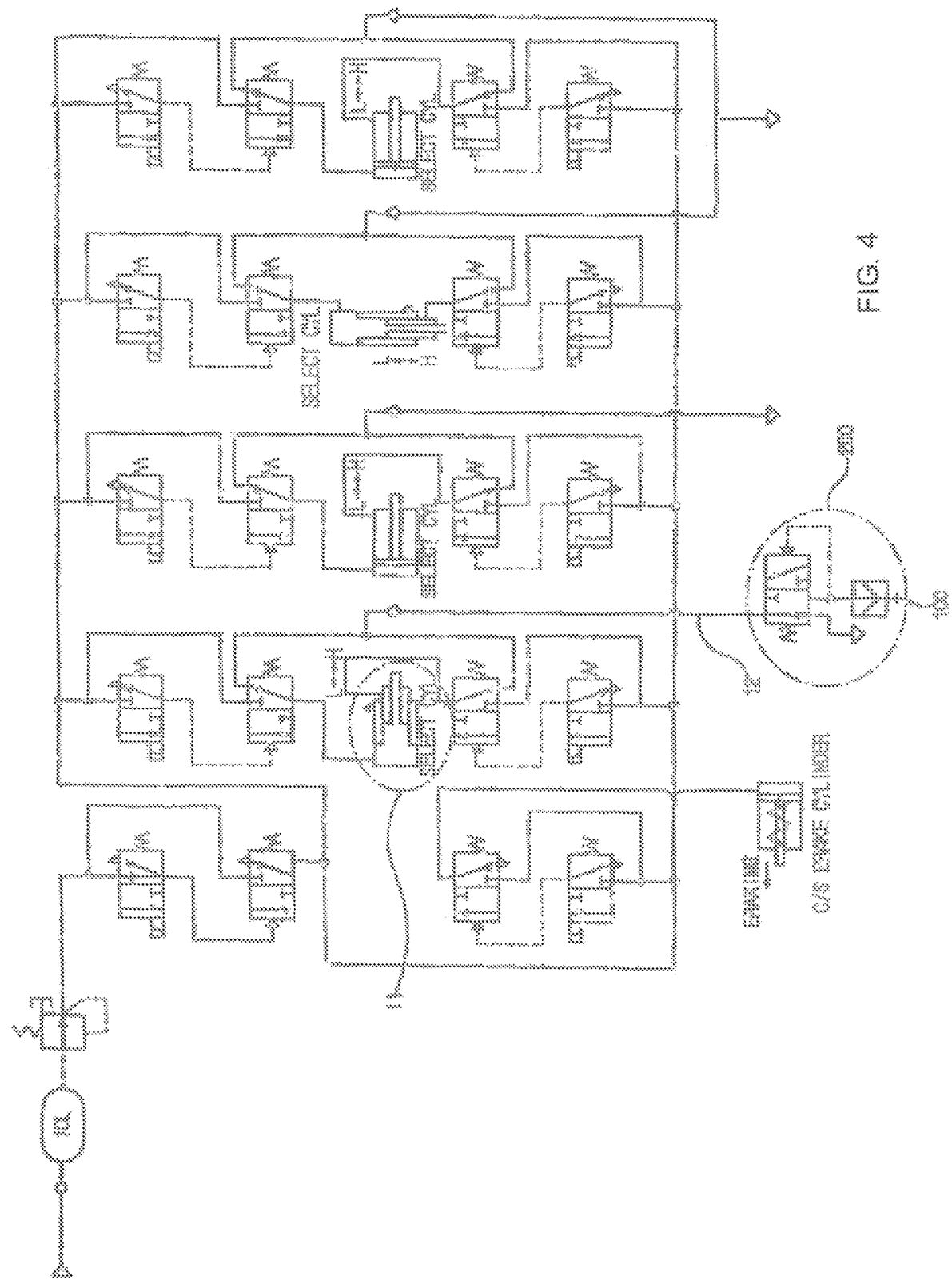
FIG. 4 is a pneumatic pressure circuit diagram showing a forced neutral return device for an automated manual transmission according to an exemplary embodiment of the present disclosure.

Referring to FIGS. 4 to 9, a forced neutral return device for an automated manual transmission according to an exemplary embodiment of the present disclosure may include an air injection passage 100 for forcibly injecting outside air into a shift cylinder 11 of a pneumatic pressure actuator for the automated manual transmission and a valve assembly 200 for opening and closing the air injection passage 100.

The air injection passage 100 may be connected with an exhaust passage 12 of the shift cylinder 11, as can be seen from FIGS. 4 and 5, FIGS. 8 and 9. As shown in FIG. 5, FIGS. 8 and 9, an air injection port 110 of the air injection passage 100 may be provided to be exposed to the outside of a transmission housing 1. Therefore, air supply mechanism may be easily connected with the air injection port 110 to inject air.

The valve assembly 200, as shown in FIGS. 6 to 9, may include a spool valve 210 for selectively opening and closing the air injection passage 100 and the exhaust passage 12 of the shift cylinder 11, a check valve assembly 220 for opening and closing the air injection port 110 of the air injection passage 100 and a spool return spring 230 for returning the spool valve 210 of the valve assembly 200 when the inflow of the outside air is blocked.

The spool valve 210 may selectively open and close the air injection passage 100 and the exhaust passage 12 of the shift cylinder 11 by the outside air that is flowed into the air injection passage 100.

The spool valve 210 may include a first spool passage 211 communicating the air injection passage 100 and the exhaust passage 12 of the shift cylinder 11 and a second spool passage 212 for opening the exhaust passage 12 so that the air in the shift cylinder 11 is exhausted when the inflow of outside air to the air injection passage 100 is blocked.

The first spool passage 211 may communicate the air injection passage 100 and the exhaust passage 12 of the shift cylinder 11 when outside air flows into the air injection passage 100 and the spool valve 210 retracts toward the spool return spring 230.

The second spool passage 212 may exhaust the air in the shift cylinder 11 to the exhaust passage 12 by communicating the air injection passage 100 and the exhaust passage 12 of the shift cylinder 11, as shown in FIG. 8. In addition, the second spool passage 212 may be formed to communicate with the exhaust passage 12 of the shift cylinder 11 as well as other cylinder exhaust passage 20 other than the shift cylinder 11.

The spool valve 210 may selectively open and close the air injection passage 100 and the exhaust passage 12 of the shift cylinder 11 through the first spool passage 211 and the second spool passage 212 to exhaust the air of the shift cylinder 11 normally and can be operated so as to inflow outside air when forced neutral is required.

The check valve assembly 220 may permit the inflow of outside air to the air injection passage 100 in order to operate the spool valve 210 and block air movement from the air injection passage 100 to the outside.

The check valve assembly 220 may include a check valve body 221, a check valve 225 slidably mounted on the check valve body 221, and a check valve spring 226 returning the check valve 225.

The check valve body 221 may include a check valve passage 222, an air inlet 223 that injects air into the check valve passage 222 from the outside and an air outlet 224 for discharging the air flowing into the check valve passage 222 to the air injection the passage 100 in order to operate the spool valve 210.

The air inlet 223 of the check valve body 221 may be fitted with an air supply device (not shown) for supplying outside air, for example, an air gun.

As shown in FIG. 8, the check valve 225 may close the air inlet 223 by the restoring force of the check valve spring 226 in the case where the air supply device is not connected with check valve body 221 and in this case, since the spool valve 210 receives only the restoring force of the spool return spring 230, the spool valve 210 advances toward the check valve 225 to be tightly contacted with the check valve 225. At this time, the second spool passage 212 of the spool valve 210 communicates with the exhaust passage 12 to open the exhaust passage 12 so that air in the shift cylinder 11 can be exhausted through the exhaust passage 12.

When the operator operates the air gun with the inlet of the air gun inserted into the air inlet 223 of the check valve 225, the outside air of the air gun flows into the check valve passage 222 of the check valve body 221 to overcome the restoring force of the check valve spring 226 so that the check valve 225 is retracted toward the spool valve 210. At this time, outside air is flowed into the air injection passage 100 through the air outlet 224.

As described above, when outside air is flowed into the air injection passage 100, as shown in FIG. 9, the spool valve 210 is retracted toward the spool return spring 230. At this time, outside air is injected into the shift cylinder 11 through the exhaust passage 12 while the first spool passage 211 of the spool valve 210 and the exhaust passage 12 of the shift cylinder 11 are communicated. The outside air injected into the shift cylinder 11 operates the shift cylinder 11 forcibly and returns the transmission to the neutral position.

As a result, the check valve 225 is normally closed by the check valve spring 226 to allow the pneumatic cylinders of the actuators to be exhausted. When forced neutral return is required, the operator can forcibly return the gear of the transmission to the neutral position only by injecting the outside air through the air supply device such as an air gun to the check valve 225.

While the present disclosure has been particularly shown and described with reference to exemplary embodiments thereof, it is to be understood that the present disclosure is not to be limited to the disclosed embodiments and it is obvious that the present disclosure can be modified or improved by a person having ordinary skill in the art within the technical idea of the present disclosure.

A simple variation or modification of the present disclosure are all within the scope of the present disclosure and the specific scope of protection of the present disclosure will be apparent from the appended claims.

What is claimed is:

1. A forced neutral return device for an automated manual transmission forcibly operating a shift cylinder of a pneumatic pressure actuator for the automated manual transmission to return shift neutral position, comprising:
   an air injection passage allows injected outside air to flow into the inside of the shift cylinder; and
   a valve assembly opening and closing the air injection passage,
   wherein the valve assembly comprises a spool valve selectively opening and closing the air injection passage and an exhaust passage of the shift cylinder by the outside air flowed into the air injection passage.

2. The forced neutral return device for the automated manual transmission of claim 1, wherein the air injection passage is connected with the exhaust passage of the shift cylinder.

3. The forced neutral return device for the automated manual transmission of claim 2, wherein the spool valve comprises:
   a first spool passage communicating the air injection passage and the exhaust passage of the shift cylinder when the outside air is flowed into the air injection passage; and
   a second spool passage opening the exhaust passage so that the air of the shift cylinder is exhausted when the outside air flowing into the air injection passage is blocked.

4. The forced neutral return device for the automated manual transmission of claim 3, wherein the valve assembly further comprises a check valve assembly allowing the inflow of the outside air into the air injection passage to operate the spool valve and blocking air movement from the air injection passage to the outside.

5. The forced neutral return device for the automated manual transmission of claim 4, wherein the valve assembly further comprises a spool return spring returning the spool valve when the inflow of outside air is blocked.

6. The forced neutral return device for the automated manual transmission of claim 4, wherein the check valve assembly comprises:
   a check valve body including a check valve passage, an air inlet injecting air into the check valve passage from the outside and an air outlet discharging the air flowed into the check valve passage to the air injection passage in order to operate the spool valve;
   a check valve provided at the check valve passage slidably; and
   a check valve spring returning the check valve.

7. The forced neutral return device for the automated manual transmission of claim 1, wherein an air injection port of the air injection passage is exposed toward the outside of a transmission housing.

* * * * *